United States Patent
Medoff et al.

(10) Patent No.: US 10,861,162 B2
(45) Date of Patent: Dec. 8, 2020

(54) OBJECT IDENTIFICATION IN DIGITAL IMAGES

(71) Applicant: eBay Inc., San Jose, CA (US)

(72) Inventors: Yoni Medoff, San Jose, CA (US); Siddharth Sakhadeo, Milpitas, CA (US); Deepu Joseph, San Jose, CA (US)

(73) Assignee: eBay Inc., San Jose, CA (US)

( * ) Notice: Subject to any disclaimer, the term of this patent is extended or adjusted under 35 U.S.C. 154(b) by 111 days.

(21) Appl. No.: 15/836,202

(22) Filed: Dec. 8, 2017

(65) Prior Publication Data

US 2019/0180446 A1 Jun. 13, 2019

(51) Int. Cl.
| | |
|---|---|
| G06T 7/187 | (2017.01) |
| G06K 9/62 | (2006.01) |
| G06T 7/90 | (2017.01) |
| G06T 7/11 | (2017.01) |

(52) U.S. Cl.
CPC ............ *G06T 7/187* (2017.01); *G06K 9/6223* (2013.01); *G06T 7/11* (2017.01); *G06T 7/90* (2017.01); *G06T 2207/10024* (2013.01); *G06T 2207/20132* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 6,654,507 B2 | 11/2003 | Luo | |
| 7,072,512 B2 * | 7/2006 | Mehrotra | ............... G06T 9/00 382/173 |
| 8,467,607 B1 * | 6/2013 | Toshev | ................ G06K 9/4642 382/173 |
| 8,634,644 B2 | 1/2014 | Chiu et al. | |
| 8,861,864 B2 | 10/2014 | Hong et al. | |
| 9,025,868 B2 | 5/2015 | Gurbuz | |

(Continued)

OTHER PUBLICATIONS

2 Answers—How does Amazon IMDB's X-Ray work?, Quora, [Online]. Retrieved from the Internet: <URL: https://www.quora.com/How-does-Amazon-IMDB%E2%80%99s-X-Ray-work>, Accessed Nov. 17, 2017, 3 pgs.

(Continued)

*Primary Examiner* — Kevin Ky
(74) *Attorney, Agent, or Firm* — Mintz Levin Cohn Ferris Glovsky and Popeo, P.C.

(57) ABSTRACT

In an example, a digital image comprising a representation of multiple physical objects is received at a client computer. The digital image is copied into a temporary canvas. The digital image is then analyzed to identify a plurality of potential object areas, each of the potential object areas having pixels with colors similar to the other pixels within the potential object area. A minimum bounding region for each of the identified potential object areas is identified, the minimum bounding region being a smallest region of a particular shape that bounds the corresponding potential object area. The pixels within a selected minimum bounding region are cropped from the digital image. The pixels within the selected minimum bounding region are then sent to an object recognition service on a server to identify an object represented by the pixels within the selected minimum bounding region.

20 Claims, 11 Drawing Sheets

(56) References Cited

U.S. PATENT DOCUMENTS

| | | | | |
|---|---|---|---|---|
| 9,177,225 | B1* | 11/2015 | Cordova-Diba | G06K 9/00671 |
| 9,240,077 | B1* | 1/2016 | Kraft | H04N 5/23293 |
| 9,508,175 | B2 | 11/2016 | Srinivasan et al. | |
| 9,798,949 | B1* | 10/2017 | Du | G06K 9/00268 |
| 2007/0110318 | A1* | 5/2007 | Bruno | G06T 7/12 |
| | | | | 382/199 |
| 2010/0027845 | A1* | 2/2010 | Kim | G06K 9/00355 |
| | | | | 382/107 |
| 2010/0027846 | A1* | 2/2010 | Xu | G06K 9/00335 |
| | | | | 382/107 |
| 2010/0260426 | A1 | 10/2010 | Huang et al. | |
| 2013/0222394 | A1* | 8/2013 | Fyke | G06T 19/20 |
| | | | | 345/467 |
| 2013/0257888 | A1* | 10/2013 | Behrens | G06T 11/40 |
| | | | | 345/589 |
| 2014/0026057 | A1* | 1/2014 | Kimpton | G06F 9/451 |
| | | | | 715/733 |
| 2014/0047413 | A1* | 2/2014 | Sheive | G06F 8/30 |
| | | | | 717/110 |
| 2014/0225928 | A1* | 8/2014 | Konnola | G06T 11/60 |
| | | | | 345/636 |
| 2015/0049902 | A1* | 2/2015 | Moraleda | G06K 9/4619 |
| | | | | 382/103 |
| 2015/0125042 | A1* | 5/2015 | Haden | G06K 9/00771 |
| | | | | 382/105 |
| 2015/0125051 | A1* | 5/2015 | Damkat | A61B 5/0205 |
| | | | | 382/128 |
| 2015/0294153 | A1* | 10/2015 | Naithani | G06K 9/00798 |
| | | | | 382/108 |
| 2015/0296250 | A1 | 10/2015 | Casper | |
| 2015/0301721 | A1* | 10/2015 | Clark | H04L 67/10 |
| | | | | 715/780 |
| 2016/0171707 | A1* | 6/2016 | Schwartz | G06K 9/342 |
| | | | | 382/180 |
| 2016/0231870 | A1* | 8/2016 | Summa | G06F 9/542 |
| 2016/0260138 | A1* | 9/2016 | Amit | G06Q 30/0641 |
| 2018/0012110 | A1* | 1/2018 | Souche | G06F 16/50 |
| 2018/0089541 | A1* | 3/2018 | Stoop | G06K 9/4685 |
| 2018/0101955 | A1* | 4/2018 | Varadarajan | G06K 9/00335 |
| 2018/0114334 | A1* | 4/2018 | Desai | G06K 9/66 |
| 2018/0137658 | A1* | 5/2018 | Zhang | G06T 11/005 |
| 2018/0150716 | A1* | 5/2018 | Farooqi | G06T 7/11 |
| 2018/0197223 | A1* | 7/2018 | Grossman | G06Q 30/0625 |

OTHER PUBLICATIONS

GitHub—inspirit/jsfeat: JavaScript Computer Vision library, [Online]. Retrieved from the Internet: <URL: https://github.com/inspirit/jsfeat>, Nov. 17, 2017, 2 pgs.

Heonia, Andrii, GitHub—AndriiHeonia/pixfinder, [Online]. Retrieved from the Internet: <URL: https://github.com/AndriiHeonia/pixtinder>, Accessed Nov. 17, 2017, 5 pgs.

Kislyuk, Dmitry, Introducing automatic object detection to visual search, [Online]. Retrieved from the Internet: <URL: https://medium.com/@Pinterest_Engineering/introducing-automatic-object-detection-to-visual-search-e57c29191c30>, Jun. 28, 2016, 7 pgs.

Perez, Sarah, Amazon Brings X-Ray to Web Video, TechCrunch, [Online]. Retrieved from the Internet: <URL: https://techcrunch.com/2016/02/22/amazon-brings-x-ray-to-web-video/>, Feb. 22, 2016, 6 pgs.

\* cited by examiner

OBJECT IDENTIFICATION IN DIGITAL IMAGES

TECHNICAL FIELD

Embodiments of the present disclosure relate generally to digital images. More particularly, the present disclosure relates to object identification in digital images.

BACKGROUND

Digital images are commonly used for many different purposes in computer systems. Use of the Internet and the growth of the World Wide Web has expanded use of digital images, and web page images are transmitted almost as much as text or other information on web pages.

Automatic recognition of objects in digital images involves using one or more computer processes to match elements of an image to an online database of identified object image, or the training of machine learned models to learn important features of images to aid in the recognition process.

Prior art techniques for object identification in digital images, however, take a significant amount of computing resources to operate effectively. As such, it is common for the object identification to be performed either offline (i.e., not in real-time) or using expensive computer servers, typically operated by large companies. Indeed, in many cases the object identification is performed using both, namely performed offline on the server-side. There are many circumstances, however, where it would be beneficial for some or all of the object identification to take place at runtime on the client-side. One example is for matching of objects relating to one web site when the images are hosted by and related to a different web site. In such instances, the web user becomes an important link between the two web sites and it would be advantageous to be able to perform at least some of the object identification aspects on the client computer of the web user. Since such client computers lack the processing power to perform such object identification in real-time, new techniques that require fewer processing resources are needed.

BRIEF DESCRIPTION OF THE DRAWINGS

Various ones of the appended drawings merely illustrate example embodiments of the present disclosure and cannot be considered as limiting its scope.

Figure 1:
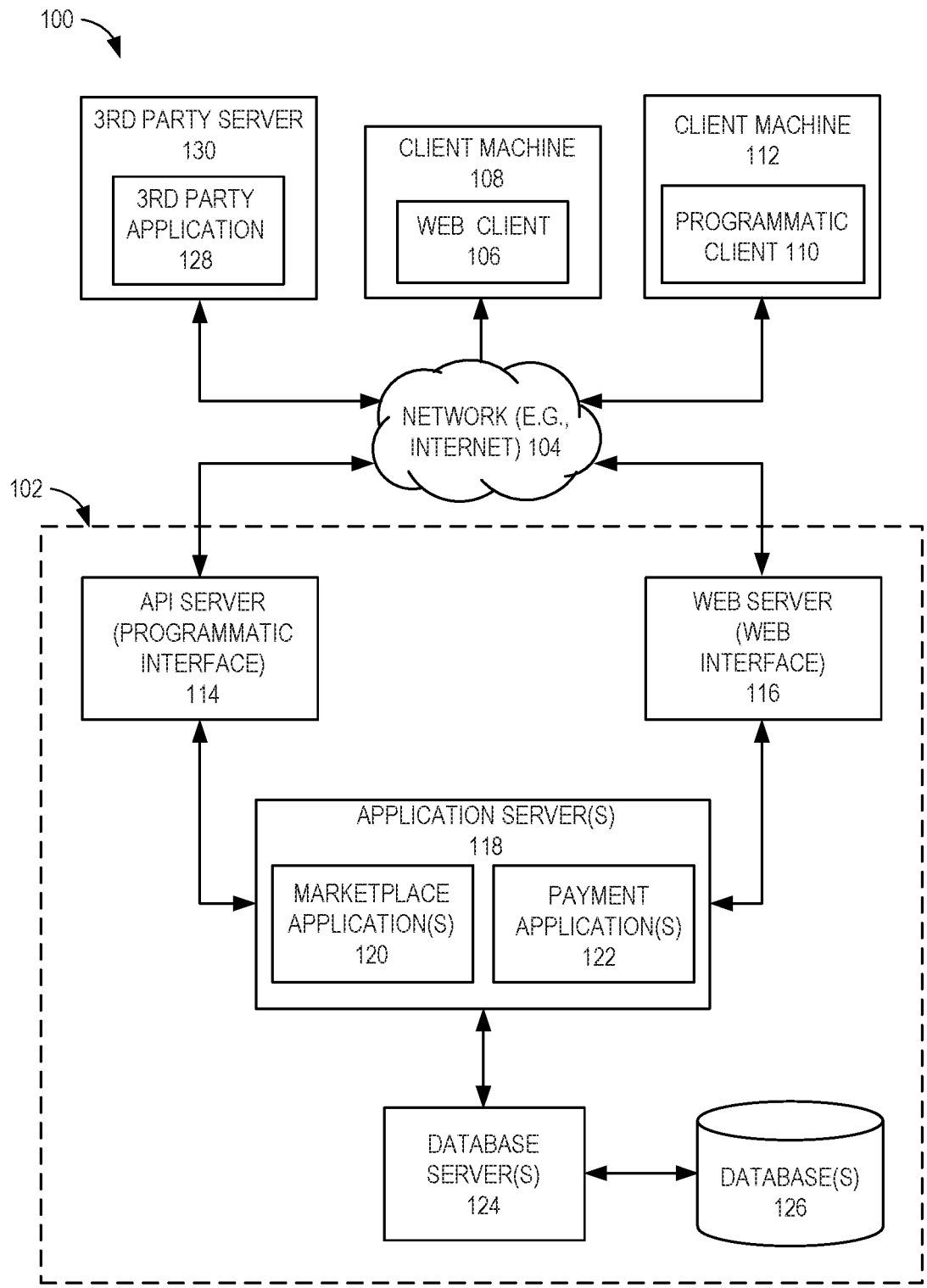
FIG. 1 is a network diagram depicting a client-server system, within which one example embodiment may be deployed.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a lightweight preprocessing technique to aid in object identification in a digital image is provided. The lightweight preprocessing technique can be performed on a client computer, and the output can be fed to an image search engine operating on a server computer to dramatically improve the relevance of returned images. Specifically, a temporary canvas such as a HyperText Markup Language (HTML) canvas is created on the client computer and a source image from a web page is copied onto that canvas. This allows a pixel data representation of the image to be extracted.

With the pixel data in place, downsampling, compression, blurring, color filtering, and/or other preprocessing techniques can be performed on the pixel data. Then the image may be segmented into multiple regions using a k-means clustering algorithm, with region growing based on features of each pixel, such as color, luminance, intensity, and location. Individual regions may then be analyzed using features such as texture and histograms of oriented gradients to detect edges of objects.

Heuristics may then be applied to the regions based on factors such as size, continuity, and density to discard noise in the edge detection. The minimum and maximum x and y values of the edge groups are then used to determine individual minimum bounding regions of objects, such as minimum bounding rectangles.

Additionally, a unique user interface (UI) overlay may be provided when the digital image is rendered, such that a visual cue is presented over each identified object in the image. Selection of this visual cue by the user then causes the corresponding minimum bounding region to be submitted to an image search engine to identify similar objects in the corpus of the image search engine. Information about these similar objects can then be used to identify the corresponding object in the digital image, or to provide other functions (such as simply returning search results of similar objects from the search corpus).

Composite images present a unique challenge for object recognition algorithms because it is difficult to determine user intent in terms of which portions of the image are relevant, and therefore should warrant further processing. In one example embodiment, the techniques described herein can be used as a preprocessing step to improve the relevancy of more complex server-side mechanisms.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 110 accesses the various services and functions provided by the marketplace and payment applications 120 and 122 via the programmatic interface provided by the API server 114. The programmatic client 110 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 110 and the networked system 102.

FIG. 1 also illustrates a third-party application 128 executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
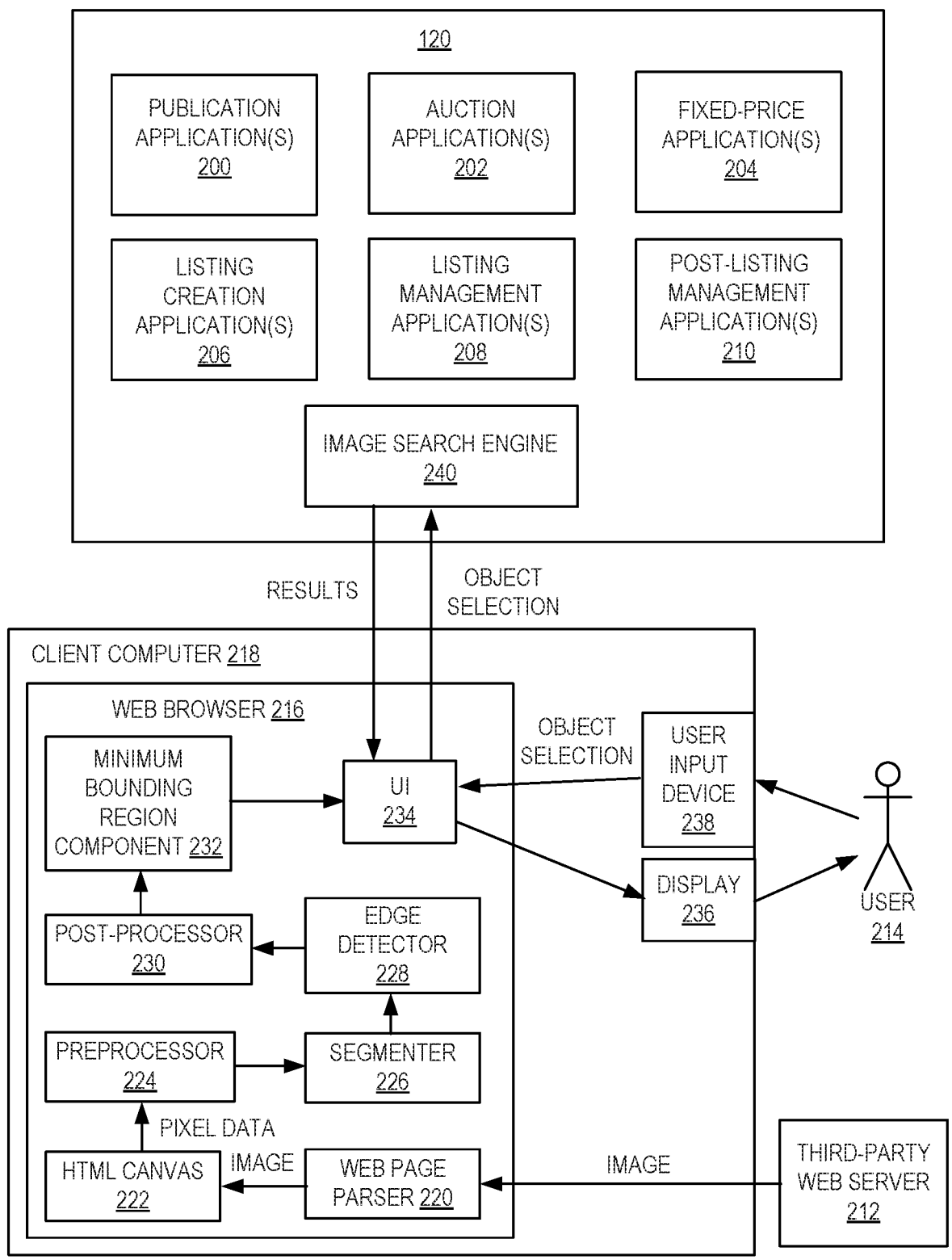
FIG. 2 is a block diagram illustrating marketplace applications that, in one example embodiment, are provided as part of the networked system.

FIG. 2 is a block diagram illustrating marketplace applications 120 that, in one example embodiment, are provided as part of the networked system 102. The marketplace applications 120 may be hosted on dedicated or shared server machines (not shown) that are communicatively coupled to enable communications between or among server machines. The marketplace applications 120 themselves are communicatively coupled (e.g., via appropriate interfaces) to each other and to various data sources, so as to allow information to be passed between or among the marketplace applications 120 or so as to allow the marketplace applications 120 to share and access common data. The marketplace applications 120 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Listing creation applications 206 allow sellers to conveniently author listings pertaining to goods or services that they wish to transact via the networked system 102, and listing management applications 208 allow sellers to manage such listings. Specifically, where a particular seller has authored and/or published a large number of listings, the management of such listings may present a challenge. The listing management applications 208 provide a number of features (e.g., auto-relisting, inventory level monitors, etc.) to assist the seller in managing such listings. One or more post-listing management applications 210 also assist sellers with a number of activities that typically occur post-listing.

A third-party web server 212 may host a image, such as part of a web page. For purposes of this document, a third-party shall be considered any entity, such as a blog, other than the entity owning and/or operating marketplace applications 120.

An image may be downloaded from the third-party web server 212. This can be triggered in a number of different ways. In one example embodiment, a user 214 operating a web browser 216 on the client computer 218 navigates to a web page that contains the image. The web page is downloaded to the browser to be parsed and displayed. FIG. 2 depicts an image being transferred from the third-party web server 212 to the web page parser 220. This may be transferred as part of this web page, although in some instances the image may be transferred separately from the web page or even in lieu of the web page. The web page parser may parse the web page (if available). As part of this parsing process, the web page parser 220 may copy the image to HTML canvas 222. It should be noted that in some example embodiments, the web page parser 220 may perform this action for each image in a web page, whereas in other example embodiments this may be performed only for a subset of the images, perhaps even influenced by user input to determine which images for which to perform this action. Indeed, all of the actions taken by the web browser 216 may be performed on all or some of the images in the web page. This may include "right-clicking" on the image using a mouse or similar user input device 238. A preprocessor 224 then extracts a pixel data representation of the image from HTML canvas 222 and performs one or more preprocessing techniques to prepare the pixel data for segmentation, including downsampling, compression, blurring, and/or color filtering, for example.

A segmenter 226 then segments the preprocessed pixel data into multiple regions. In an example embodiment, the segmenter 226 using a k-means clustering with region growing algorithm, using features of each pixel, such as color, luminance, intensity and/or location, for example. An edge detector 228 then analyzes individual regions using features such as texture and histograms of oriented gradients in order to detect edges of objects in each region. A post-processor 230 then performs one or more post-processing techniques on the areas within the detected edges, including techniques based on factors such as size, continuity, and density to discard noise in the edge detection.

A minimum bounding region component 232 uses minimum and maximum x and y values of the edge groups to determine individual minimum bounding regions of objects in the image data. A UI 234 can then render the image, for example with the rest of the web page, but may treat the image differently during the rendering by rendering an actionable visual cue on each minimum bounding region, such as at the center of each minimum bounding region. The image and the actionable visual cue may be rendered by the UI on a display 236, which is viewable by the user 214. This actionable visual cue may be in the form of a selectable overlay such that when the actionable visual cue over a particular minimum bounding box is selected or otherwise interacted with via a user input device 238, the area in the minimum bounding region (hereinafter referred to as the object) is selected and sent to an image search engine 240, which may return results for rendering by the UI 234 on the display 236. These results may take many forms. In one example embodiment, the image search engine 240 returns one or more images containing objects similar to the selected object. In another example embodiment, the image search engine 240 returns one or more web pages, such as product web pages on an ecommerce site, that contain one or more images that contain one or more objects similar to the selected object. It should be noted that both display 236 and user input device 238 are depicted in FIG. 2 as being at the edge of client computer 218 to indicate that these components may be either contained within the client computer 218, such as a touchscreen display of a smartphone, or may be separate from the client computer 218, such as an external display and mouse or keyboard.

As an example, the original image may have been an image of a person wearing clothes, and the web browser 216, according to the present disclosure, may delineate various objects of clothing being worn in the picture, without actually identifying those objects. The user 214 may select on an actionable visual cue for a particular article of clothing and just the area depicting that particular article of clothing may be sent to the image search engine 240 for identification. As such, while the web browser 216 is identifying areas that correspond to different objects in the image, the web browser is not actually performing the identification of what those objects are. This allows the aforementioned functionality to be executed on resource-limited devices, such as smartphones, while also providing a conduit by which the web browser 216 can connect images from third-party web server 212 to results generated by marketplace applications 120 operated by a different entity, thereby eliminating the need for the marketplace applications 120 to interface directly with third-party web server 212, which would have its own technical and legal challenges.

It should be noted that the term "web browser" as used in this disclosure shall be interpreted broadly to cover any application capable of rendering images from a web server. As such, this may include traditional web browsers as well as stand-alone applications (or apps) operating on mobile or other devices. For example, the web browser 216 could be a traditional web browser such as Internet Explorer from Microsoft Corp., a stand-alone app such as a shopping application, a video player app, etc.

In an example where the web browser is a stand-alone app, it may be operating on, for example, a mobile device having a display and a camera. The techniques described herein could therefore be applied to an image obtained by the mobile device from an outside source, such as via the Internet, an image previously stored on the mobile device, or an image taken by the camera on the mobile device, potentially in real-time. Indeed the techniques described herein can be applied on any device that is capable of obtaining a digital image and transmitting portions of that digital image to another device. Mobile devices are certainly one example, but others are possible as well, as wearables and head-mounted devices.

Embodiments where the camera is used in real-time to capture images on which the techniques described in this document are applied may also be useful in virtual reality or augmented reality device. For example, a camera in an augmented reality device may capture an image while simultaneously overlaying graphics or other images over the captured image. The techniques described herein can be applied to the captured image or the composite image formed by the combination of the captured image and the overlay(s).

It should also be noted that while aspects of the disclosure describe the output being fed to an image search engine, in some example embodiments other server-based mechanisms could be used either in conjunction with or in lieu of the image search engine. For example, server-based mechanisms for performing actions other than searching based on the image may be used, such as image recognition (where objects in the image are identified, either in the general sense (e.g., "this is a picture of a purse") or in the specific sense (e.g., "this is a picture of a Coach purse with SKU #12345")).

As described above, the functionality implementing many of the processes described in the present disclosure is located on the client device. This may be accomplished in a number of different ways. In some example embodiments, the third-party entity publishing web pages to third-party web server 212 may alter one or more of the web pages to include the processes described in the present disclosure. For example, an HTML code snippet or Javascript script that embodies the processes can be transmitted from the entity operating the marketplace applications 120 to the third party entity and the third party entity can then alter the published web pages to include or reference this code or script. The code or script will then be downloaded by the client computer 218 automatically as part of the web page when the web browser 216 navigates to the web page. Of course, such an embodiment would involve the cooperation of the entity operating the marketplace applications 120 and the third party entity.

In other example embodiments, the processes described in the present disclosure are embedded into the web browser 216, such as through downloading and installation of a plug-in that, when activated, alters the functionality of the web browser 216. This plug-in may, for example, dynamically alter web code or script downloaded by the web browser 216 to include the processes described in the present disclosure.

Notably, in the above-described embodiments, since the functionality is implemented at the client computer, detection of use of the processes described in the present disclosure can be accomplished by looking for a plug-in with the processes on the client computer and/or reviewing the HTML code and/or script of rendered web pages to find code or script implementing the processes.

Figure 3:
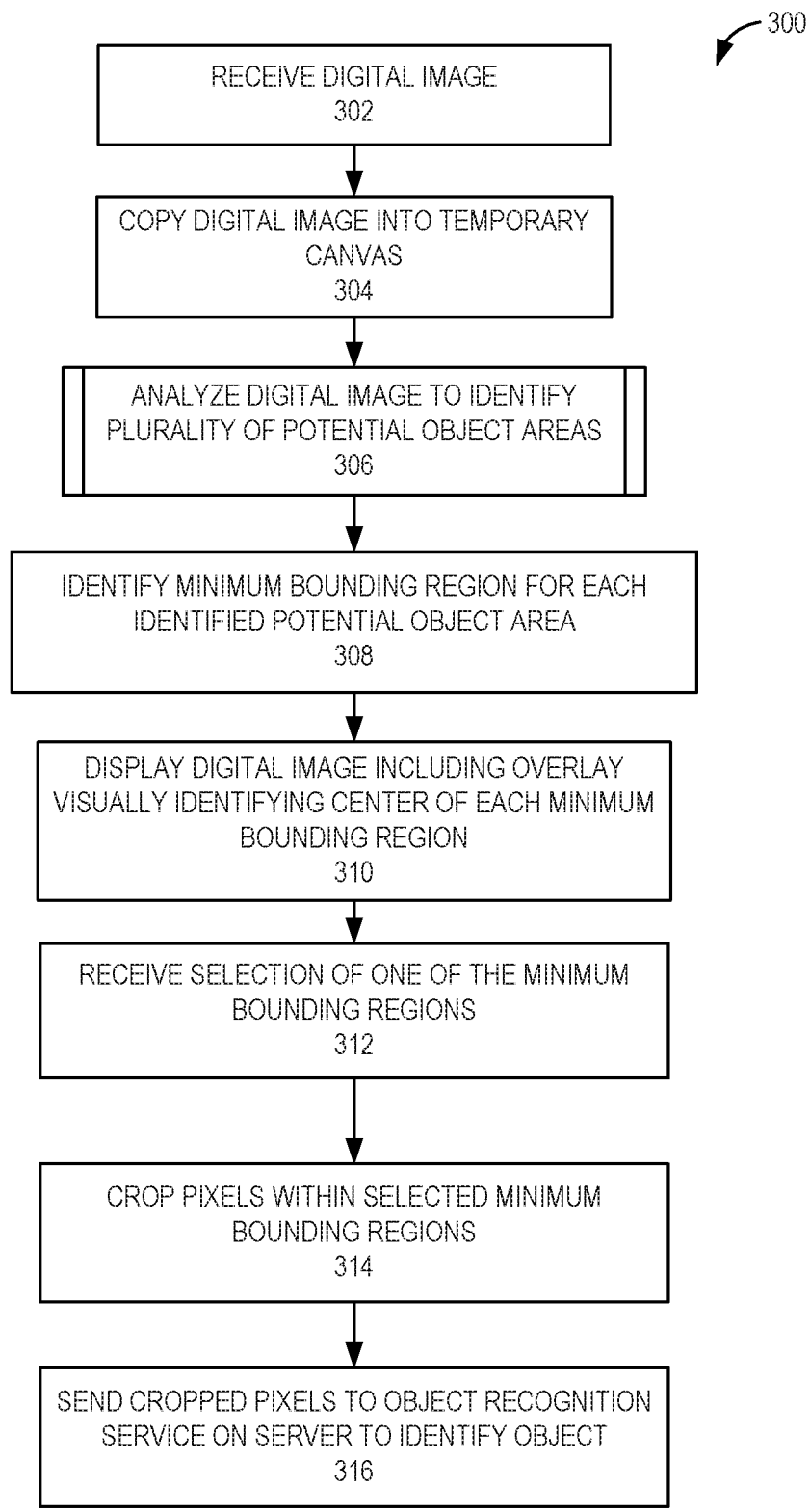
FIG. 3 is a flow diagram illustrating a method of operating a web browser, in accordance with an example embodiment.

FIG. 3 is a flow diagram illustrating a method 300 of operating a web browser, in accordance with an example embodiment. At operation 302, a digital image comprising a representation of multiple physical objects is received at a client computer. At operation 304, the digital image is copied into a temporary markup language canvas. In an example embodiment, this copying is performed from a script, so a third-party site need only include the script in the web page. Alternatively, a browser plug-in may inject the script dynamically into a web page. Within the script, the logic to create the canvas element(s) and then draw the images as needed is included. For example, the following pseudocode could be used:

```
var canvas = document.createElement('canvas');
var context = canvas.getContext('2d');
context.drawImage(image, 0, 0);
```

At operation 306, the digital image is analyzed to identify a plurality of potential object areas, with each of the potential object areas having pixels with colors similar to the other pixels within the potential object area. At operation 308, a minimum bounding region for each of the identified potential object areas is identified. The minimum bounding region is a smallest region of a particular shape that bounds the corresponding potential object area. For example, if the particular shape is a rectangle, then the minimum bounding region is the minimum-sized rectangle that bounds the object area. At operation 310, the digital image is displayed on a display, including an overlay visually identifying a center of each of the minimum bounding regions in the digital image.

At operation 312, a selection of one of the minimum bounding rectangles is received. This selection may be triggered via selection of the overlay for the corresponding minimum bounding region. At operation 314, the pixels within the selected minimum bounding region are cropped from the digital image. At operation 316, the pixels within the selected minimum bounding rectangle are sent to an object recognition service on a server to identify an object represented by the pixels within the selected minimum bounding region. In some example embodiments, this object recognition service may be the image search engine 240 of FIG. 2.

Figure 4:
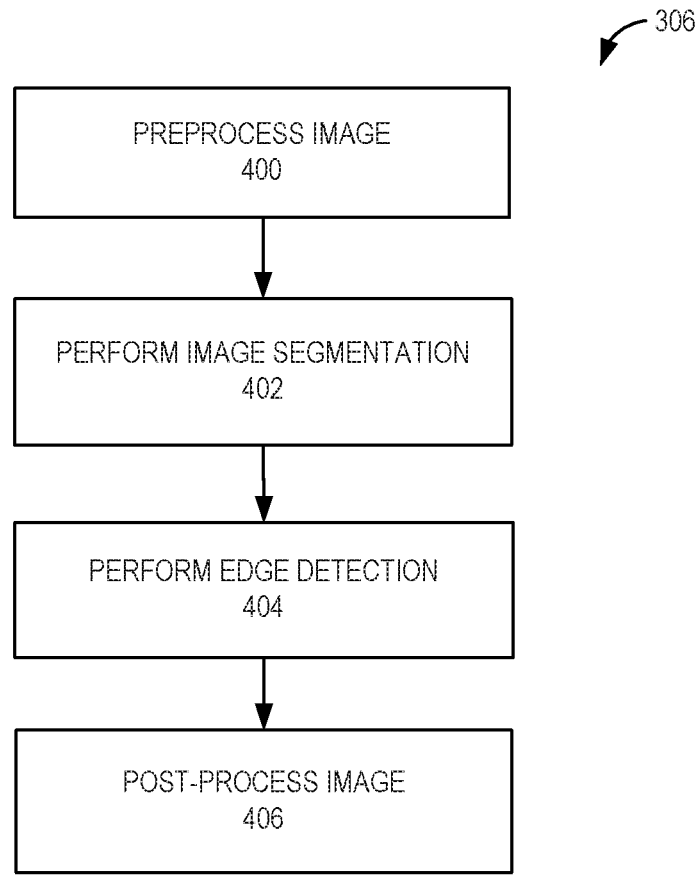
FIG. 4 is a flow diagram illustrating operation of FIG. 3 in more detail.

FIG. 4 is a flow diagram illustrating operation 306 of FIG. 3 in more detail. At operation 400, preprocessing is performed on the digital image. This may include, for example, downsampling, compression, blurring, and/or color filtering. At operation 402, image segmentation is performed. Here the image is segmented into multiple regions using a segmentation algorithm, such as k-means clustering with region growing based on features of each pixel, such as color, luminance, intensity, and location. At operation 404, edge detection is performed. Here individual regions are analyzed to identify potential edge areas using features such as texture and histograms of oriented gradients. At operation 406, one or more post processing techniques is applied, for example heuristics based on size, continuity, and density to discard noise in edge detection.

Figure 5:
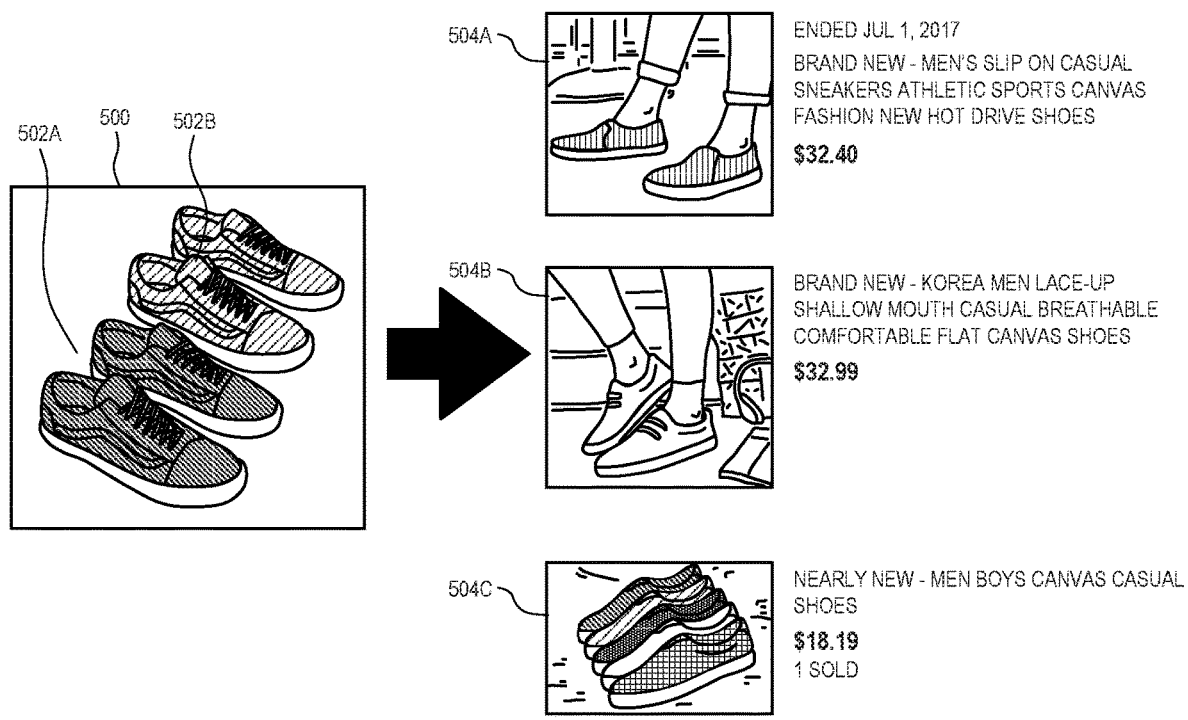
FIG. 5 is a diagram graphically illustrating a traditional image-based search.

FIG. 5 is a diagram graphically illustrating a traditional image-based search. Here, the image 500 includes two different pairs of shoes 502A, 502B. Specifically, while both pairs of shoes 502A, 502B are the same style, they are not the same color. Submission of this image 500 to an image-based search engine may return a plurality of products 504A-504C that have a similar style to the pairs of shoes 502A, 502B but do not match or even come close to the colors.

Figure 6:
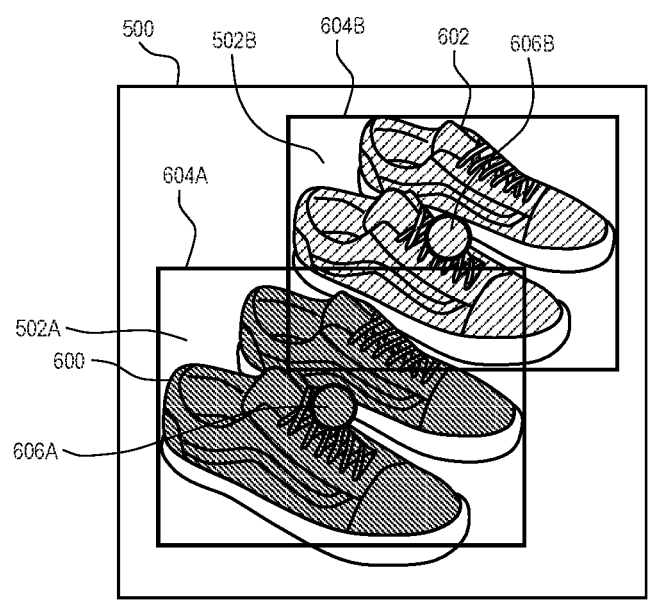
FIG. 6 is a diagram graphically illustrating the processes described in FIGS. 3 and 4 above.

FIG. 6 is a diagram graphically illustrating the processes described in FIGS. 3 and 4 above. Specifically, edges such as edge 600 and edge 602 have been detected in the image 500, and minimum bounding rectangles 604A and 604B have been drawn around the corresponding pairs of shoes 502A, 502B. Actionable visual cues 606A, 606B can then be rendered in the center of minimum bounding rectangles 604A, 604B. It should be noted that these actionable visual cues 606A, 606B are depicted here for general understanding of the underlying concepts of the present disclosure. In practice, as will be seen in later diagrams, the actionable visual cues 606A, 606B will be rendered over a "clean" version of the image 500 and the edges 600, 602 and minimum bounding rectangles 604A, 604B will not be displayed to the user.

In an example embodiment, the actionable cues 606A, 606B may be rendered with a color primarily matching a dominant color of the portion of the image in the underlying minimum bounding rectangle 604A, 604B, in order to blend in with the image and not appear too contrasting, while still being visible as a separate actionable cue via, for example, a white or black border.

Figure 7:
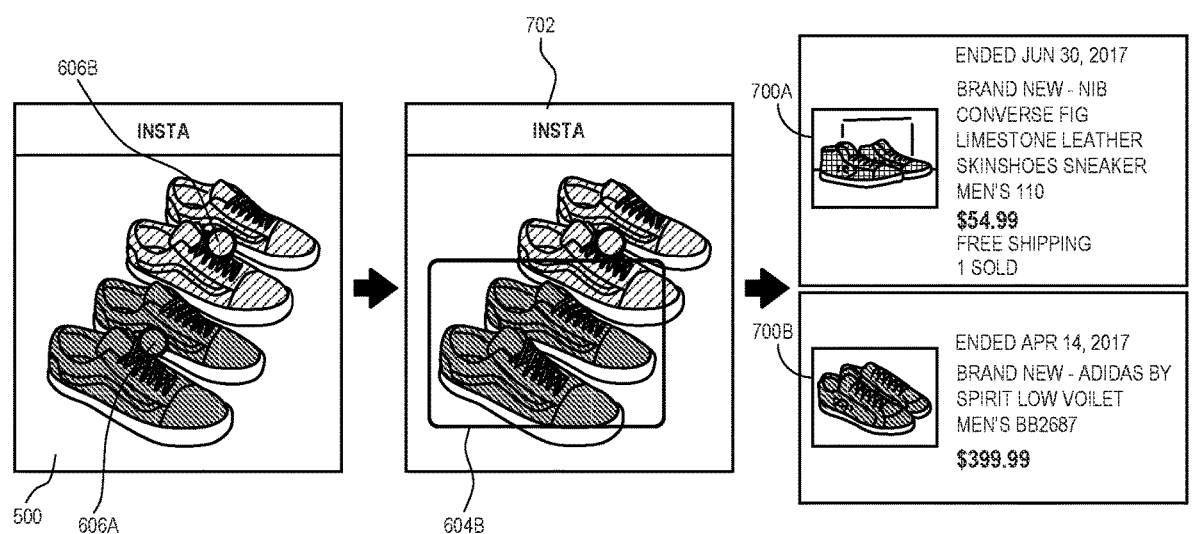
FIG. 7 is a diagram graphically illustrating an image-based search, in accordance with an example embodiment.

FIG. 7 is a diagram graphically illustrating an image-based search in accordance with an example embodiment. Specifically, actionable cues 606A, 606B are rendered over a clean version of image 500. The user may then select on one of these actionable cues 606A, 606B. Here, the user has selected actionable cue 606B. This causes the area within the minimum bounding rectangle 604B corresponding to actionable cue 606B to be cropped and sent to an image search engine, which may return products 700A, 700B. Notably, products 700A, 700B are closer to or matching in color to the pair of shoes 502B depicted in the area within the minimum bounding rectangle 604B. It should be noted that screen 702 is depicted here for general understanding of the underlying concepts of the present disclosure and would not ordinarily, in practice, be visible to the user.

Figure 8:
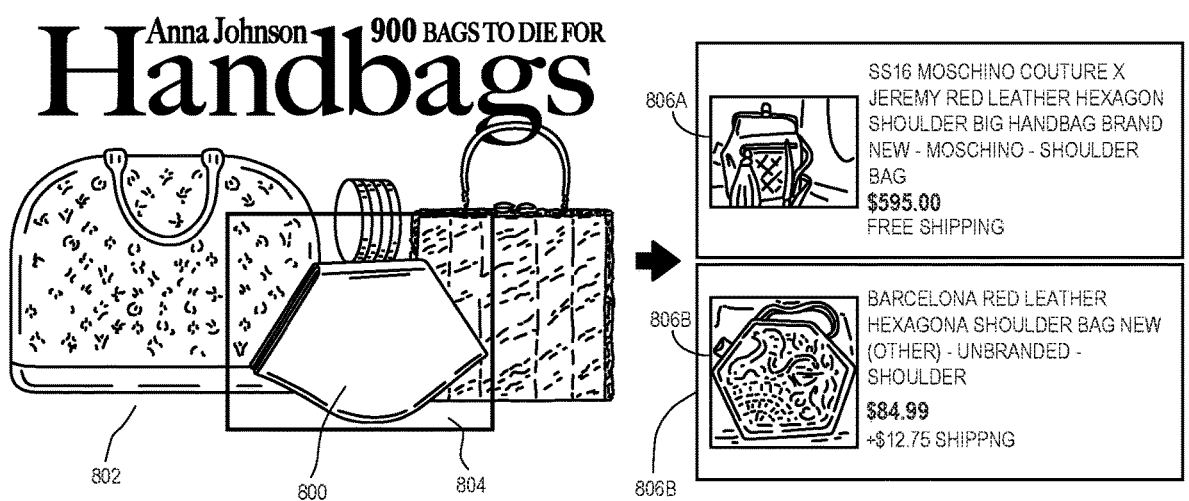
FIG. 8 is a diagram graphically illustrating an image-based search, in accordance with another example embodiment.

Of course, the underlying concepts of the present disclosure are not limited to differentiating between similar items of different color, but can also be extended to other visual aspects of the items. FIG. 8 is a diagram graphically illustrating an image-based search, in accordance with another example embodiment. Specifically, here a user may have selected a visual cue associated with handbag 800 in image 802. The area within the minimum bounding rectangle 804 surrounding this handbag 800 may then be cropped and sent to an image search engine, which returns products 806A, 806B, which are similar visually to handbag 800. Notably, image 802 is part of an article on handbags and is not, itself, part of web page exclusively devoted to handbags. Indeed, the concepts of the present disclosure can be applied to images taken from any source, and allows otherwise static web pages, such as articles or blogs, to become dynamic by allowing users to select on rendered actionable cues corresponding to objects within images from those web pages. This is despite little or no involvement of the third-party entity that publishes the web page and without the entity operating the image search engine or selling the products 804A, 804B directly interfacing with the third-party entity that publishes the web page.

Figure 9:
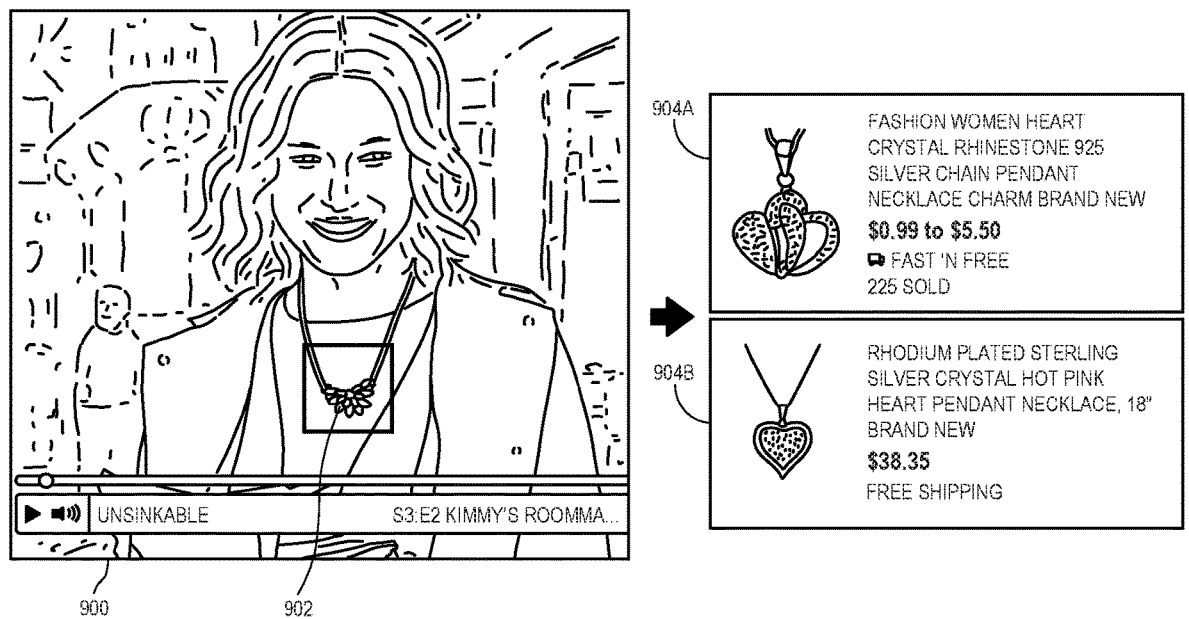
FIG. 9 is a diagram graphically illustrating an image-based search for an image extracted from an online video, in accordance with another example embodiment.

The still images can be extracted from any type of graphical information. For example, FIG. 9 is a diagram graphically illustrating an image-based search for an image extracted from an online video, in accordance with another example embodiment. Specifically, an online video player 900 may be paused in the middle of a streaming show or movie and the processes described in the present disclosure can be applied to the image captured from the paused video. Here, the video playing in the online video player 900 is a television (TV) show and the processes described in the present disclosure are able to identify a minimum bounding rectangle around a necklace 902 worn by a character in the image. An actionable cue may then be rendered over the necklace 902, allowing the viewer to select the actionable cue to view products 904A, 904B similar to the necklace. It should be noted that other than the selection of the actionable cue, in some example embodiments this is all accomplished without specific actions required of the user. Indeed, the user need not even pause the video. Rather, in some example embodiments, a still image of a running video may be captured automatically and the processes of the present disclosure applied to this still image. The actionable cues in such an embodiment may be rendered on subsequent frames of the running video and may even be designed to move along with the underlying objects as the video progresses (or disappear and reappear as scenes or angles change to hide or reveal the underlying objects).

Figure 10:
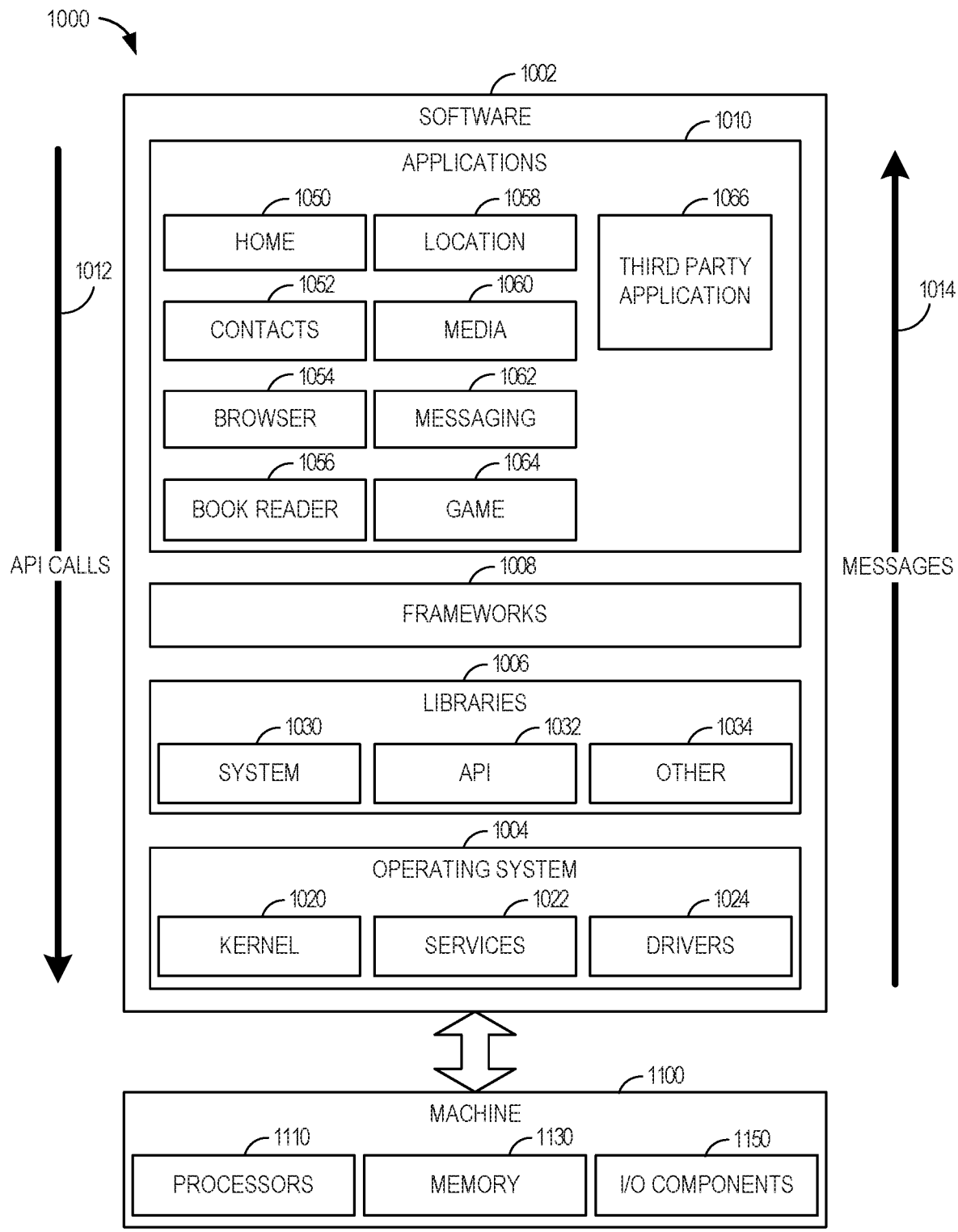
FIG. 10 is a block diagram illustrating an architecture of software, which can be installed on any one or more of the devices described above.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and input/output (I/O) components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
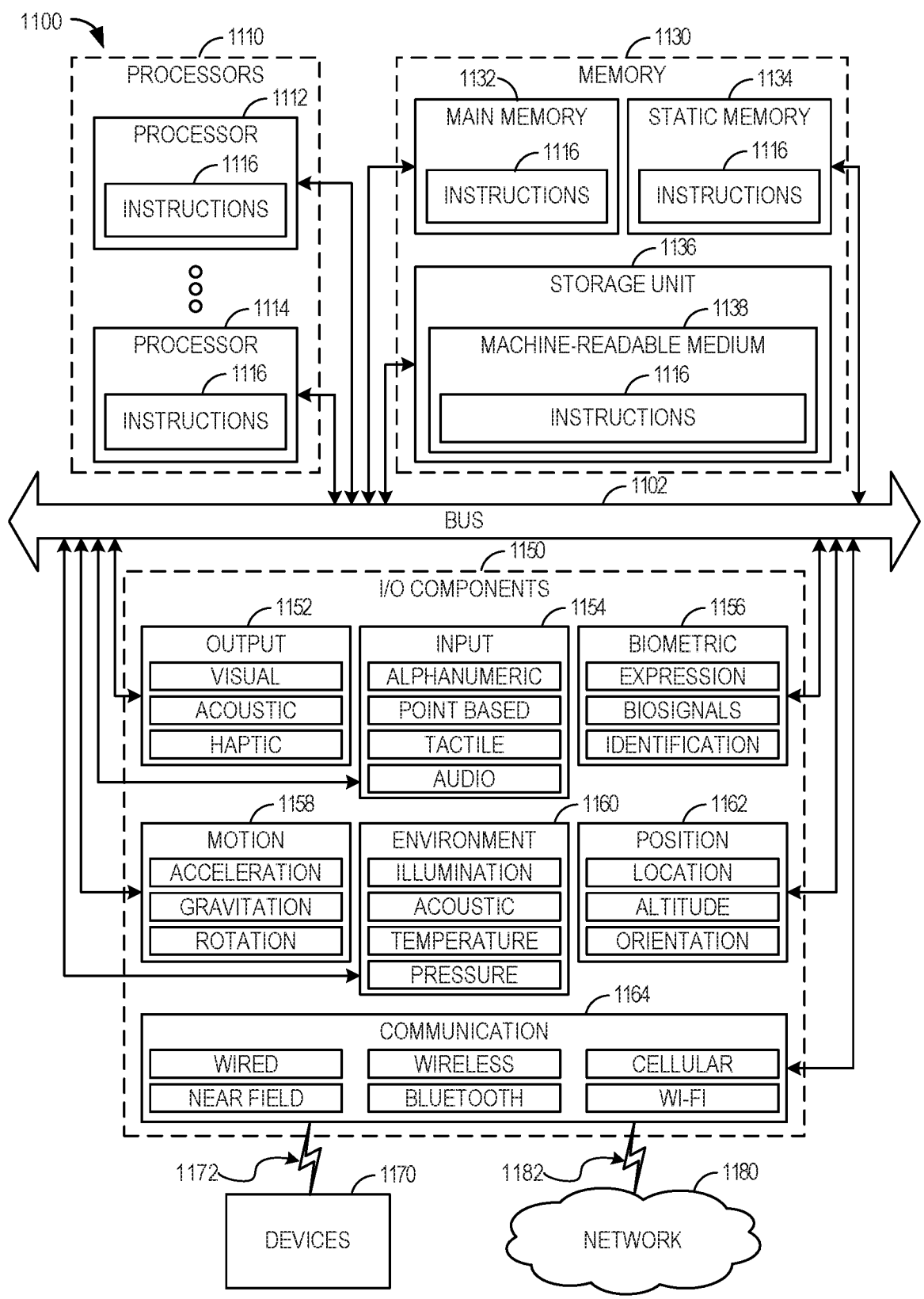
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods 300, 304 of FIGS. 3 and 4. Additionally, or alternatively, the instructions 1116 may implement FIGS. 1-4, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer readable medium having instructions stored there on, which, when executed by a processor, cause the system to perform operations comprising:
receiving, at a client computer, a digital image from a third-party website, the digital image comprising a representation of multiple physical objects;
copying, at the client computer, the digital image into a temporary canvas to generate pixels to enable analyzing, identifying, and cropping at the client computer;
analyzing, at the client computer, the digital image to identify a plurality of potential object areas, each of the plurality of potential object areas having pixels with colors similar to the other pixels within the potential object area;
identifying, at the client computer, a separate minimum bounding region for each of the individual identified potential object areas, the separate minimum bounding region being a smallest region of a particular shape that bounds the corresponding potential object area;
cropping, at the client computer, the pixels within a selected minimum bounding region from the digital image, wherein the cropping includes removing the pixels from the digital image;
sending, at the client computer and to a publication system including an object recognition service, the cropped pixels within the selected minimum bounding region to identify an object represented by the cropped pixels within the selected minimum bounding region; and
receiving, at the client computer and in response to sending the cropped pixels within the selected minimum bounding region, a listing from the publication system, the listing including at least one product matching the object represented by the cropped pixels.

2. The system of claim 1, wherein the operations further comprise causing the system to display, to a user, in a graphical user interface, the cropped pixels for each minimum bounding region for selection.

3. The system of claim 2, wherein the sending the cropped pixels includes sending cropped pixels only for the selected minimum bounding region and not for minimum bounding regions not selected by the user in the graphical user interface.

4. The system of claim 1, wherein the identifying a minimum bounding region includes detecting edges of objects based on textures and histograms of oriented gradients.

5. The system of claim 1, wherein the instructions further cause the system to cause display of the digital image on a display, including an overlay visually identifying a center of each of the minimum bounding regions in the digital image.

6. The system of claim 1, wherein the analyzing comprises:
performing image segmentation on the digital image, wherein the image segmentation segments the image into multiple regions using a segmentation algorithm based on features of each pixel, wherein the features include color, luminance, intensity, and location.

7. The system of claim 6, wherein the client computer lacks the processing power to perform object recognition in real-time.

8. A method comprising:
receiving, at a client computer, a digital image from a third-party website, the digital image comprising a representation of multiple physical objects;
copying, at the client computer, the digital image into a temporary canvas to generate pixels to enable analyzing, identifying, and cropping at the client computer;
analyzing, at the client computer, the digital image to identify a plurality of potential object areas, each of the plurality of potential object areas having pixels with colors similar to the other pixels within the potential object area;
identifying, at the client computer, a separate minimum bounding region for each of the individual identified potential object areas, the separate minimum bounding region being a smallest region of a particular shape that bounds the corresponding potential object area;
cropping, at the client computer, the pixels within a selected minimum bounding region from the digital image, wherein the cropping includes removing the pixels from the digital image;
sending, at the client computer and to a publication system including an object recognition service, the cropped pixels within the selected minimum bounding region to identify an object represented by the cropped pixels within the selected minimum bounding region; and
receiving, at the client computer and in response to sending the cropped pixels within the selected minimum bounding region, a listing from the publication system, the listing including at least one product matching the object represented by the cropped pixels.

9. The method of claim 8, wherein each of the potential object areas further have pixels with intensities similar to the other pixels within the potential object area.

10. The method of claim 8, wherein each of the potential object areas further have pixels with luminance similar to the other pixels within the potential object area.

11. The method of claim 8, wherein the identifying a minimum bounding region includes detecting edges of objects based on textures and histograms of oriented gradients.

12. The method of claim 8, further comprising causing display of the digital image on a display, including an overlay visually identifying a center of each of the minimum bounding regions in the digital image.

13. The method of claim 8, wherein the analyzing comprises:
performing image segmentation on the digital image, wherein the image segmentation segments the image into multiple regions using a segmentation algorithm based on features of each pixel, wherein the features include color, luminance, intensity, and location.

14. The method of claim 13, wherein the segmentation algorithm includes k-means clustering with region growing.

15. A non-transitory computer-readable storage medium comprising instructions that, when executed by at least one processor of a machine, cause the machine to perform operations comprising:

receiving, at a client computer, a digital image from a third-party website, the digital image comprising a representation of multiple physical objects;

copying, at the client computer, the digital image into a temporary canvas to generate pixels to enable analyzing, identifying, and cropping at the client computer;

analyzing, at the client computer, the digital image to identify a plurality of potential object areas, each of the plurality of potential object areas having pixels with colors similar to the other pixels within the potential object area;

identifying, at the client computer, a separate minimum bounding region for each of the individual identified potential object areas, the separate minimum bounding region being a smallest region of a particular shape that bounds the corresponding potential object area;

cropping, at the client computer, the pixels within a selected minimum bounding region from the digital image, wherein the cropping includes removing the pixels from the digital image;

sending, at the client computer and to a publication system including an object recognition service, the cropped pixels within the selected minimum bounding region to identify an object represented by the cropped pixels within the selected minimum bounding region; and receiving, at the client computer and in response to sending the cropped pixels within the selected minimum bounding region, a listing from the publication system, the listing including at least one product matching the object represented by the cropped pixels.

16. The non-transitory computer-readable storage medium of claim 15, wherein each of the potential object areas further have pixels with intensities similar to the other pixels within the potential object area.

17. The non-transitory computer-readable storage medium of claim 15, wherein each of the potential object areas further have pixels with luminance similar to the other pixels within the potential object area.

18. The non-transitory computer-readable storage medium of claim 15, wherein the identifying a minimum bounding region includes detecting edges of objects based on textures and histograms of oriented gradients.

19. The non-transitory computer-readable storage medium of claim 15, wherein the operations further comprise: causing display of the digital image on a display, including an overlay visually identifying a center of each of the minimum bounding regions in the digital image.

20. The non-transitory computer-readable storage medium of claim 15, wherein the analyzing comprises:
performing image segmentation on the digital image, wherein the image segmentation segments the image into multiple regions using a segmentation algorithm based on features of each pixel, wherein the features include color, luminance, intensity, and location.

* * * * *